(12) United States Patent
Yang et al.

(10) Patent No.: US 11,686,283 B2
(45) Date of Patent: Jun. 27, 2023

(54) CONVEX TYPE GUIDE PLATE WATERWHEEL ENERGY INCREASING DEVICE WITH GRADUALLY DENSE HOLES

(71) Applicant: Hohai University, Nanjing (CN)

(72) Inventors: Chunxia Yang, Nanjing (CN); Zhen Zhang, Nanjing (CN); Yan Hu, Nanjing (CN); Mengshang Zhao, Nanjing (CN); Yan Ding, Nanjing (CN); Huiwen Liu, Nanjing (CN)

(73) Assignee: HOHAI UNIVERSITY, Nanjing (CN)

( * ) Notice: Subject to any disclaimer, the term of this patent is extended or adjusted under 35 U.S.C. 154(b) by 33 days.

(21) Appl. No.: 17/358,045

(22) Filed: Jun. 25, 2021

(65) Prior Publication Data

US 2022/0003198 A1 Jan. 6, 2022

(30) Foreign Application Priority Data

Jul. 1, 2020 (CN) .......................... 202010622208.2

(51) Int. Cl.
 *F03B 11/00* (2006.01)
 *F03B 17/06* (2006.01)

(52) U.S. Cl.
 CPC ............ *F03B 11/00* (2013.01); *F03B 17/062* (2013.01)

(58) Field of Classification Search
 CPC .... F03B 3/16; F03B 3/18; F03B 11/00; F03B 11/02; F03B 11/025; F03B 17/063;
 (Continued)

(56) References Cited

U.S. PATENT DOCUMENTS

2022/0003198 A1* 1/2022 Yang ....................... F03B 11/00

FOREIGN PATENT DOCUMENTS

CN 101440773 B 5/2011
CN 104595092 A 5/2015
(Continued)

*Primary Examiner* — Christopher R Legendre
(74) *Attorney, Agent, or Firm* — Gearhart Law, LLC; David Postolski

(57) ABSTRACT

A convex type guide plate waterwheel energy increasing device with gradually dense holes is provided. The convex type guide plate waterwheel energy increasing device comprises fixed devices, a main diversion plate and auxiliary diversion plates, wherein an upwards convex arc structure is arranged on the top surface of the main diversion plate, gradually dense first through holes are formed in the main diversion plate from the middle to the two ends, the diameters of the first through holes are gradually increased, the auxiliary diversion plates are connected to the two sides of the main diversion plate, second through holes are formed in the auxiliary diversion plates, fixed devices are fixed to the two sides of the auxiliary diversion plates, and the fixed devices are used for fixing the main diversion plate and the auxiliary diversion plates to the riverbed. Through the convex type main diversion plate with the gradual dense holes with different heights, the device adapts to the condition that the distance between the waterwheel and the bottom of the riverbed is different along with the change of the phase angle, kinetic energy of low-velocity air at the bottom of the riverbed is conveyed to the impeller area of the waterwheel, the effective acceleration area in the river channel is large, the average velocity of water flow in the impeller area of the waterwheel is increased, and the output power of the unit is improved.

11 Claims, 6 Drawing Sheets

(58) Field of Classification Search
CPC .......... F03D 1/04; F03D 3/002; F03D 3/0454;
F03D 3/0463; F03D 3/0481; F03D 3/049;
F05B 2240/121; F05B 2240/13; F05B
2240/131; F05B 2240/132; F05B
2240/133
See application file for complete search history.

(56) References Cited

FOREIGN PATENT DOCUMENTS

| | | | | |
|---|---|---|---|---|
| CN | 207145118 U | | 3/2018 | |
| CN | 109185041 A | * | 1/2019 | ............... F03D 1/04 |
| CN | 109322783 B | * | 8/2019 | ............... F03D 1/04 |

* cited by examiner

CONVEX TYPE GUIDE PLATE WATERWHEEL ENERGY INCREASING DEVICE WITH GRADUALLY DENSE HOLES

CROSS REFERENCE TO RELATED APPLICATION(S)

This patent application claims the benefit and priority of Chinese Patent Application No. 202010622208.2, filed on Jul. 1, 2020, the disclosure of which is incorporated by reference herein in its entirety as part of the present application.

TECHNICAL FIELD

The present disclosure relates to a convex type guide plate waterwheel energy increasing device with gradually dense holes, and belongs to the technical field of hydroelectric generation.

BACKGROUND ART

At present, the type of hydropower development is to built hydropower stations generally, the high-efficiency water turbine is used for converting hydropower, but the hydropower station has certain requirements on geology, investment, environment and the like, and along with the construction and completion of a large batch of large-scale hydropower stations in China in recent years, ultra-low head and micro-head power generation devices become a hot spot in the field of hydroelectric generation in recent years, low-head resources are further developed and utilized, and a new environment-friendly solution is provided for water ecological civilization and urbanization construction and transformation of old and small hydropower plants.

During the period of industrial revolution, water energy is a main energy source, the water energy is further utilized by taking the waterwheel as power through the utilization of open channel head resources mostly, and during the period of industrial revolution, a large number of waterwheels are built in countries such as Germany, France and Polish for utilizing the open channel micro-head resources as power. As water energy conversion equipment, the waterwheel has the advantages of low cost and high income, but a large number of micro-head resources are not developed at present, so that Baga and Hydrowatt companies in Germany, part of American waterwheel plants and the like begin to produce power generation waterwheels again. The waterwheel is generally regarded as low-efficiency water energy conversion equipment, and then, due to the development of water turbines and generators, the function of the water energy conversion equipment of the waterwheel is replaced, and the waterwheel is widely applied in life.

In China, low-head hydraulic resources are very rich and are generally located in economically developed areas of the middle and lower reaches of rivers, open channel micro-head hydraulic resources such as open channel rivers, gate overflows and streams are developed, utilization of waterwheels for power generation is an effective way, and a batch of scholars and enterprises have began to pay attention to and research utilization of waterwheels for power generation abroad. The waterwheel mainly operates in the shallow water layer of the open channel and utilizes kinetic energy of water flow to do work so as to generate electricity, and the shallow water layer has a plurality of adverse factors such as large voracity, high turbulence intensity and low water flow velocity at the bottom of shallow water, so that in order to efficiently and stably generate electricity, the waterwheel is generally installed at some channel outlets with high flow velocity. Therefore, how to improve the water energy utilization rate of the waterwheel is particularly necessary.

Chinese Patent Application No. 201721139361.X discloses a lower impact type waterwheel utilizing a low-head micro-hydropower station. The device comprises a bearing support frame, a rotating shaft, blades and a diversion flow channel. The rotating shaft is arranged on the bearing support frame, a runner framework is connected to the rotating shaft, a runner is connected to the runner framework, a plurality of blades are fixed to the runner, each blade is of a wing-shaped structure with curved surface radian, the blades are circumferentially distributed on the runner with the rotating shaft as the center, and the inlet end of the diversion flow channel is higher than the outlet end of the diversion flow channel. According to the device, blades of a traditional lower impact type waterwheel are improved through previous research, the blades of the runner adopt the wing-shaped design with curved surface radian, the impact loss of water flow passing through inlets of the blades is reduced to improve the output power of the runner, the runner is circumferentially distributed in space and fixed to the runner framework, and the hydraulic efficiency of the waterwheel is improved. However, the manufacturing and machining precision of the device is high, the output power and the efficiency of the waterwheel are improved only by changing the design of the blades, so that the performance of the waterwheel is improved in a limited mode, meanwhile, low and stable flow velocity usually exists at the bottom of the upper stream of the river channel, and the efficiency of the whole device is low due to the fact that kinetic energy of the part is not utilized.

Chinese Patent Application No. 201310529185.0 discloses a waterwheel power generation device. The device mainly consists of waterwheel wheels, a flow pushing plate, a buoyancy tank, a sliding block support, a sliding rail, a buoyancy sliding block, a bearing, a power generator, power generator blades, a cement support and a water channel. The device can be arranged at any place with large water flow, the water flow power is accelerated through the water channel, the position of the waterwheel is adjusted according to the height of the water level, the power of the generator is kept, and the device has the characteristics of being convenient to install and easy to achieve. However, the device does not utilize the low-velocity kinetic energy at the bottom of the upper stream of the river channel, so that the overall hydraulic performance of the waterwheel is low.

Chinese Patent Application No. 200810072478.X discloses a combined type water energy power generation device. The device comprises a plurality of rows of installation frames, each row of installation frames is provided with a plurality of transverse water through hole channels in the longitudinal direction, each row of installation frames is correspondingly provided with a lifting water blocking plate used for opening and closing the corresponding row of installation frames, each transverse water through hole channel is provided with an impeller, and the rear ends of impeller rotating shafts arranged in the same row are in transmission connection with a vertical power transmission shaft through a pair of conical reversing gears respectively so as to drive the generator arranged at the upper end of the vertical power transmission shaft to work through the vertical power transmission shaft. Although the device can be combined to form a corresponding dam body type hydroelectric generation device according to the actual condition of the river channel, the structure is simple, the water flow is easy to control, and when the device does not consider different working conditions, the efficiency of the impellers is greatly different, so that the overall efficiency of the device is not high, and the hydraulic performance of the device is poor.

In conclusion, according to an existing waterwheel power generation device utilizing a micro head, the working capacity of the waterwheel is improved in the aspects of blade wing type, installation position, installation form and the like, the natural environment in the open channel river channel is complex, and higher investment is certainly caused by changing the installation form, installation position and the like of the waterwheel to improve the working capacity of the waterwheel, and the capability of improving work is limited. How to overcome the defects in the prior art, effectively improve the working capacity of the waterwheel and ensure the quality of electric power output by the waterwheel becomes one of the important problems urgently needed to be solved in the technical field of power generation by fully utilizing the micro-head at present.

SUMMARY

In order to overcome the defect that the improvement of waterwheel performance is limited due to the design of waterwheel blades in the prior art, the present disclosure provides a convex type guide plate waterwheel energy increasing device with gradually dense holes, so that the energy increasing device is arranged on the upstream of the river channel to effectively improve the waterwheel performance. As a preferable scheme, the energy increasing device can convert the deep low-velocity water flow on the upstream of the river channel into the water flow at the shallow high-velocity water flow of the river channel, so that the performance of the waterwheel is improved. As a whole, the holes are gradually densely distributed from the middle to the two ends, energy of open channel flow surface water flow and bottom low-velocity water flow can be efficiently utilized, the output power of the waterwheel can be effectively improved, meanwhile, the load fluctuation of the waterwheel can be reduced, and in the construction process, compared with a power station, the investment is low, the equipment is convenient to manufacture, and meanwhile, the problem that fish schools can smoothly pass through the holes is solved, and the device has the characteristics of environmental friendliness, excellent output power quality and the like.

In order to solve the technical problem, the technical scheme adopted by the present disclosure is as follows:

A convex type guide plate waterwheel energy increasing device with gradually dense holes comprises fixed devices, a main diversion plate and auxiliary diversion plates, an upwards convex arc structure is arranged on the top surface of the main diversion plate, gradually dense first through holes are formed in the main diversion plate from the middle to the two ends, the diameters of the first through holes are gradually increased, the auxiliary diversion plates are connected to the two sides of the main diversion plate, second through holes are formed in the auxiliary diversion plates, fixed devices are fixed to the two sides of the auxiliary diversion plates, and the fixed devices are used for fixing the main diversion plate and the auxiliary diversion plates to the riverbed.

As a preferable scheme, the heights of the auxiliary diversion plates are consistent with the heights of the two sides of the main diversion plate, the main diversion plate is set to be of an axisymmetric structure, and the main diversion plate is of a plane structure with the same thickness or with a thin upper portion and a thick lower portion or a curved surface structure with the same thickness or with a thin upper portion and a thick lower portion.

As a preferable scheme, the included angles between the main diversion plate and the riverbed as well as between the auxiliary diversion plates and the riverbed are set to be 45° to 90°.

As a preferable scheme, the length of the main diversion plate is 0.9-1.3 times of the width of the waterwheel runner, the diameter of the contour line of the arc structure at the top of the main diversion plate is 0.8-2.5 times of the length of the main diversion plate, the distances between the tops of the auxiliary diversion plates and the free liquid level are 0-0.15 times of the height of the waterwheel runner, and the depths of the auxiliary diversion plates penetrating into the riverbed are 0.2-0.6 times of the height of the waterwheel runner.

As a preferable scheme, the ratios of the lengths of the auxiliary diversion plates to the length of the main diversion plate are 0-0.4.

As a preferable scheme, the fixed devices comprise a base, a guide plate support is arranged on the base, inserting grooves are formed in the inner side of the guide plate support, the outer sides of the auxiliary diversion plates are fixed to the guide plate support through the inserting grooves, locking sleeve holes are transversely formed in the guide plate support, locking pins are inserted from the outer sides of the locking sleeve holes, and the tail ends of the locking pins are fixed to the outer side surfaces of the auxiliary diversion plates; and supports are arranged on the front surface and the rear surface of the main diversion plate, and ground anchors are arranged at the tail ends of the supports.

As a preferable scheme, the distance between the main diversion plate and the center of the waterwheel is 1-2.5 times of the diameter of the waterwheel runner.

As a preferable scheme, the porosity of the main diversion plate is smaller than that of the auxiliary diversion plates, the porosity of the main diversion plate is in the range of 2% to 8%, and the porosity of the auxiliary diversion plates is in the range of 5% to 15%.

As a preferable scheme, the first through holes and the second through holes are triangular, circular or oval in shapes.

The convex type guide plate waterwheel energy increasing device with gradually dense holes provided by the present disclosure has the beneficial effects that the energy increasing device is additionally arranged at the upstream position of the waterwheel, low-velocity kinetic energy of the upstream bottom of the river channel is fully utilized, low-velocity kinetic energy of deep water flow of the upper river channel is converted into high-velocity kinetic energy of shallow water flow of the river channel, and then the output power and efficiency of the waterwheel are improved. Beneficial effects are as follows:

Firstly, the utilization rate of micro-head energy is improved. The flow velocity in open channel flow generally presents log-law distribution along the water depth, the flow velocity at the bottom of the riverbed is low, the flow velocity on the surface of the water flow is high, through the porous diversion plates with different heights, the device adapts to the difference of the distance between the waterwheel and the bottom of the riverbed along with the change of the phase angle, kinetic energy of low-velocity air at the bottom of the riverbed is conveyed to the impeller area of the waterwheel, the effective acceleration area is large, the average velocity of the upstream side of the impeller area of the waterwheel is improved, and the output power of the unit is improved.

Secondly, the load fluctuation of the unit is reduced. Due to the fact that the flow velocity of water flow close to the lower half portion of the impeller area of the waterwheel is increased, the average pressure borne by each blade in the waterwheel runner area is reduced, meanwhile, the turbulence intensity of incoming flow is further reduced to a certain degree, the stress non-uniformity of the waterwheel runner is reduced, and the service life is prolonged.

Thirdly, the device is simple in structure, low in economic cost and high in safety. The diversion plates are of porous structures, the material consumption is small, the cost is low, meanwhile, the porous structure bears small thrust from water flow, and the stability of the diversion plate structures and the safety of unit operation are facilitated.

Fourthly, the device is fish-friendly. The porous diversion plates can effectively improve the output power of the waterwheel, fish can smoothly pass through the auxiliary plates and the two sides of the top of the main plate, the migration of the fish can be effectively protected, and a fish-friendly effect is achieved.

Fifthly, the device adapts to various working conditions. When the flow changes, the included angle between the energy increasing device and the bottom of the riverbed can be adjusted by adjusting the angles of the supports, and under different flow conditions, the diversion plates can effectively provide an energy increasing effect.

DETAILED DESCRIPTION OF THE EMBODIMENTS

Figure 1:
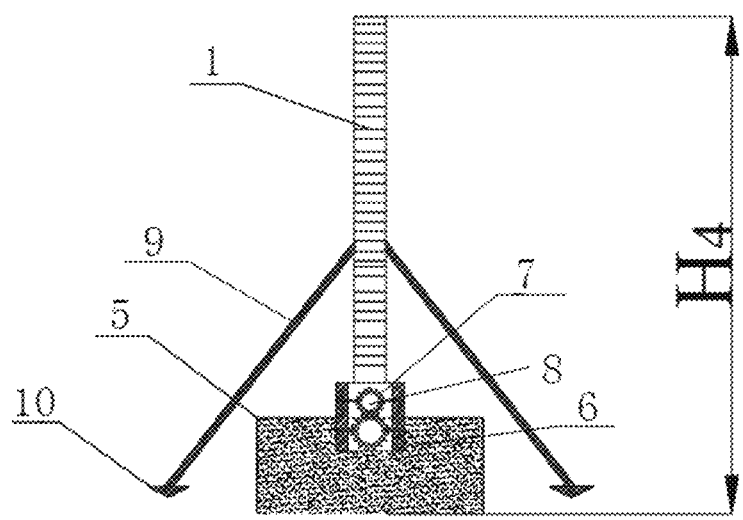
FIG. 1 is a structural schematic diagram of an energy increasing device in the present disclosure.
Figure 2:
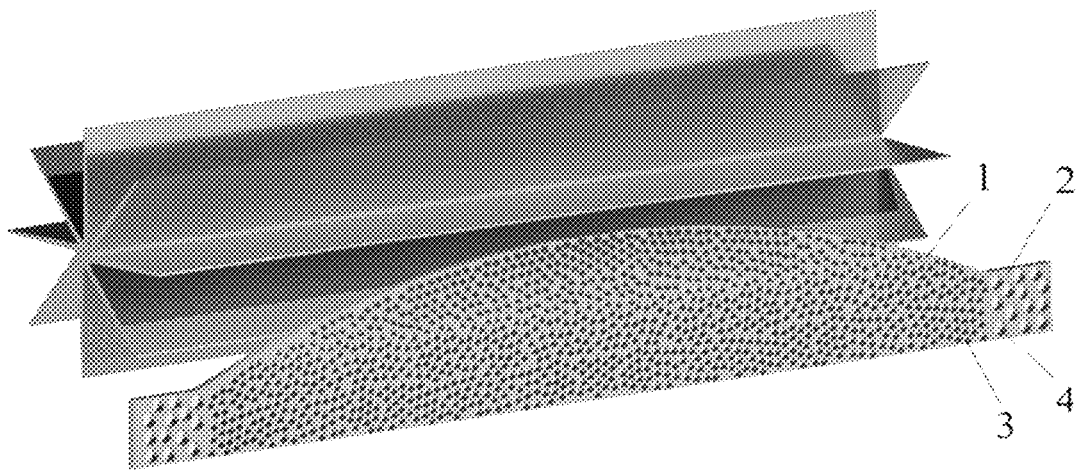
FIG. 2 is a three-dimensional schematic diagram of the energy increasing device in the present disclosure.
Figure 3:
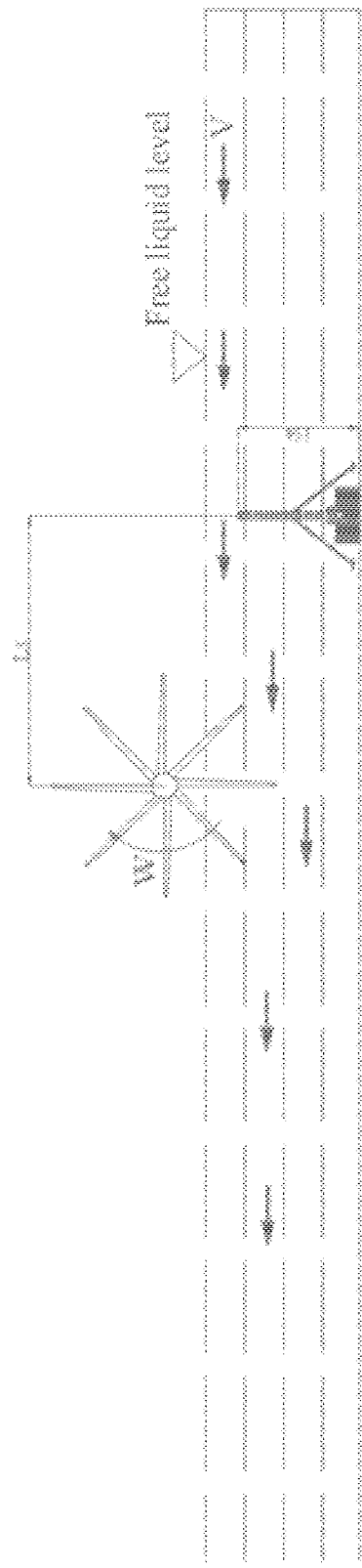
FIG. 3 is an installation schematic diagram of the energy increasing device in the present disclosure.
Figure 4:
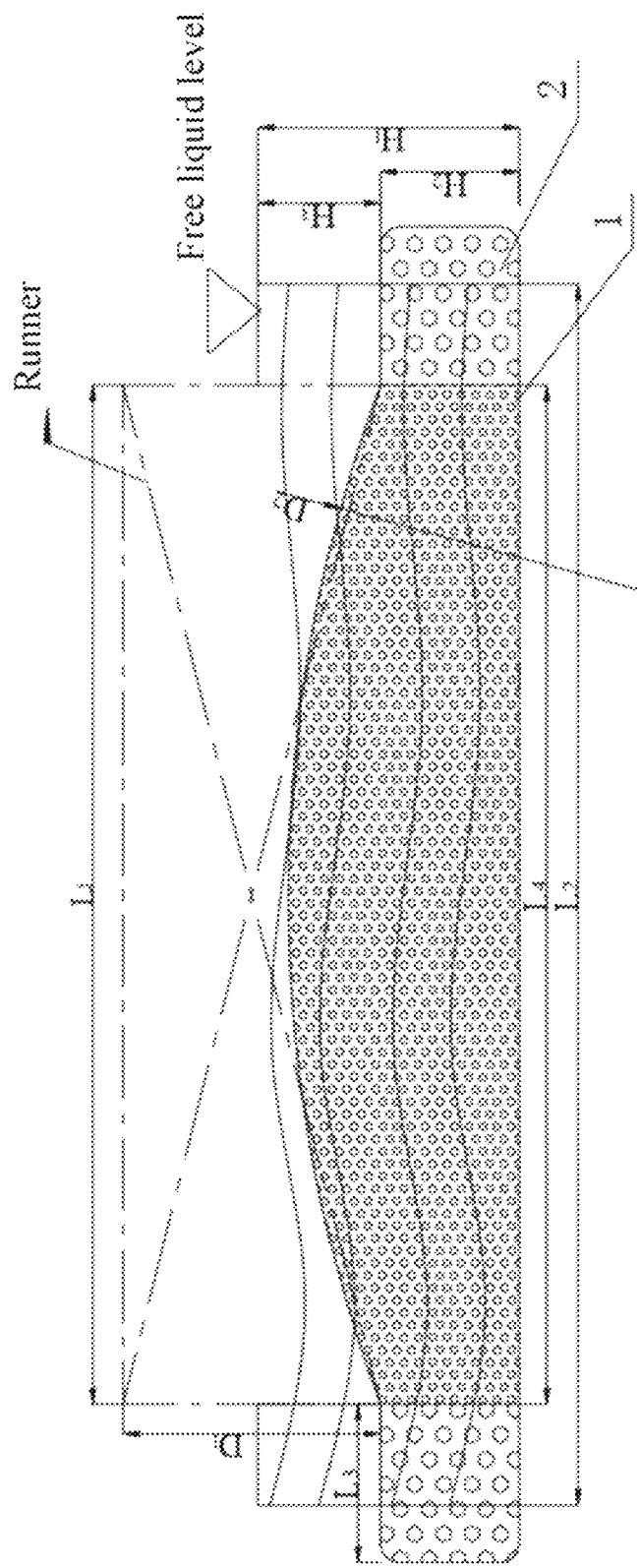
FIG. 4 is a front view of the energy increasing device along the river direction in the present disclosure.

The present disclosure is further described below in combination with the attached figures.

As shown in FIG. 1 to FIG. 4, a convex type guide plate waterwheel energy increasing device with gradually dense holes in the present disclosure comprises fixed devices, a main diversion plate 1 and auxiliary diversion plates 2, an upwards convex arc structure is arranged on the top surface of the main diversion plate 1, gradually dense first through holes 3 are formed in the main diversion plate 1 from the middle to the two ends, the diameters of the first through holes 3 are gradually increased, the auxiliary diversion plates 2 are connected to the two sides of the main diversion plate 1, second through holes 4 are formed in the auxiliary diversion plates 2, fixed devices are fixed to the two sides of the auxiliary diversion plates 2, and the fixed devices are used for fixing the main diversion plate 1 and the auxiliary diversion plates 2 to the riverbed. The fixed devices comprise a base 5, a guide plate support 6 is arranged on the base 5, inserting grooves are formed in the inner side of the guide plate support 6, the outer sides of the auxiliary diversion plates 2 are fixed to the guide plate support 6 through the inserting grooves, locking sleeve holes 7 are transversely formed in the guide plate support 6, locking pins 8 are inserted from the outer sides of the locking sleeve holes 7, and the tail ends of the locking pins 8 are fixed to the outer side surfaces of the auxiliary diversion plates 2; and supports 9 are arranged on the front surface and the rear surface of the main diversion plate 1, and ground anchors 10 are arranged at the tail ends of the supports 9.

Figure 5:
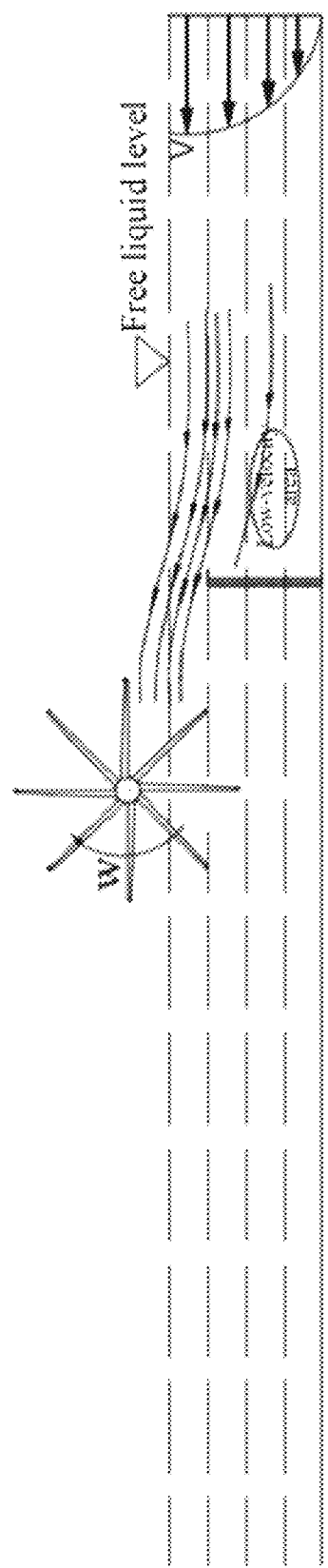
FIG. 5 is a schematic diagram of the energy increasing device in the present disclosure.

As shown in FIG. 5, the implementation principle of the present disclosure is that the flow velocity in open channel flow generally presents log-law distribution along the water depth, the flow velocity at the bottom of the riverbed is low, the flow velocity on the surface of the water flow is high, the waterwheel mainly utilizes the flow velocity of the water flow to do work, through the main diversion plate with the gradually dense through holes with different heights, the distance between the waterwheel and the bottom of the riverbed is different along with the change of the phase angle, kinetic energy of low-velocity air at the bottom of the riverbed is conveyed to the impeller area of the waterwheel, the effective acceleration area in the river channel is large, the average velocity of water flow in the impeller area of the waterwheel is increased, and the output power of the unit is improved.

Embodiment I

Figure 6:
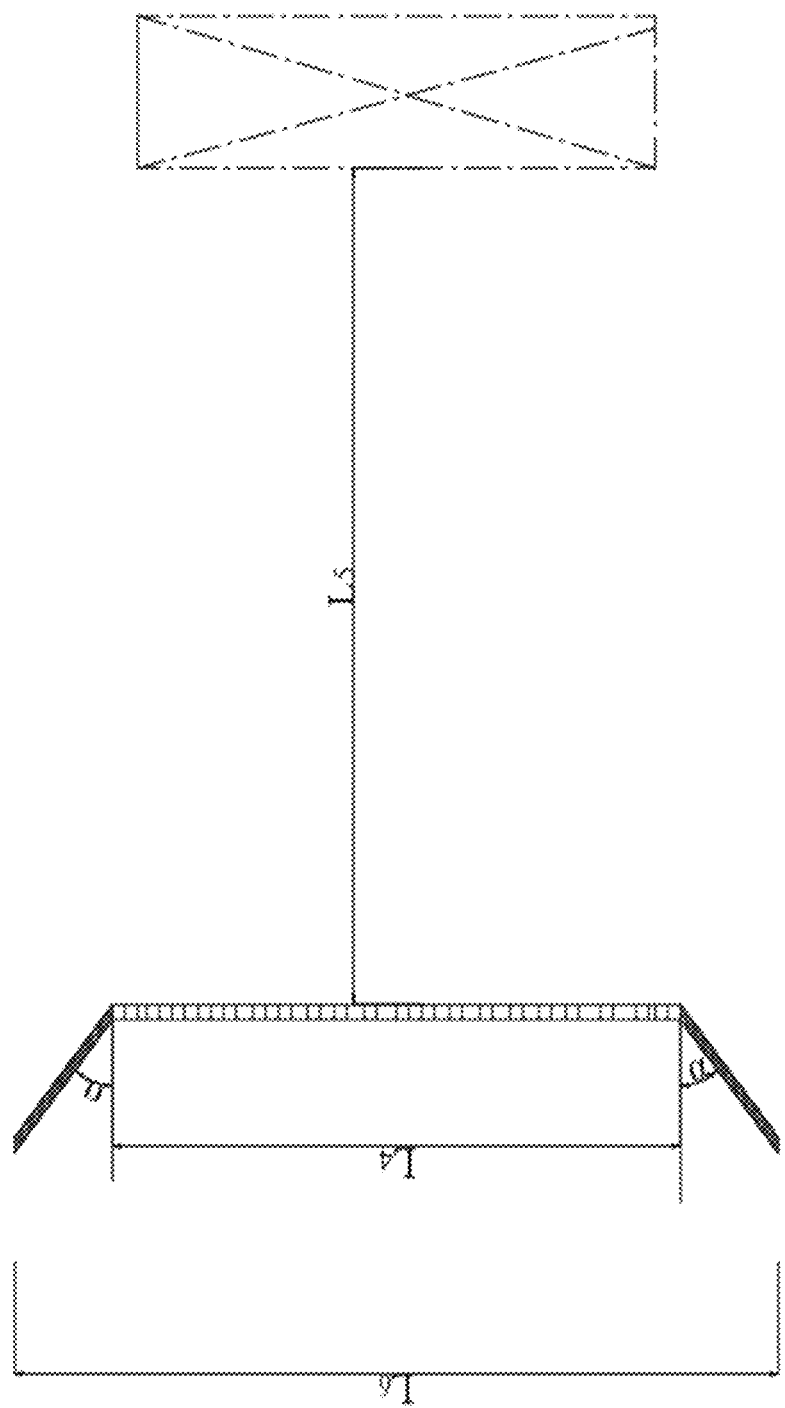
FIG. 6 is a top view of a plane-shaped main diversion plate in the present disclosure.

As shown in FIG. 6, the main diversion plate is of a plane structure with the same thickness or with a thin upper portion and a thick lower portion, the included angles between the main diversion plate and the riverbed as well as between the auxiliary diversion plates and the riverbed are set to be 45° to 90°, and the main diversion plate is set to be of an axisymmetric structure.

The supports as auxiliary supporting are installed on the front surface and the rear surface of the main diversion plate, and ground anchors are used for anchoring the supports at the bottom of the riverbed.

The base and the guide plate support are of rigid structures and are kept fixed at the bottom of the riverbed, the angle between the main diversion plate and the bottom of the riverbed can be adjusted through the supports, and large output is provided for the waterwheel under different incoming flow conditions.

Embodiment II

Figure 7:
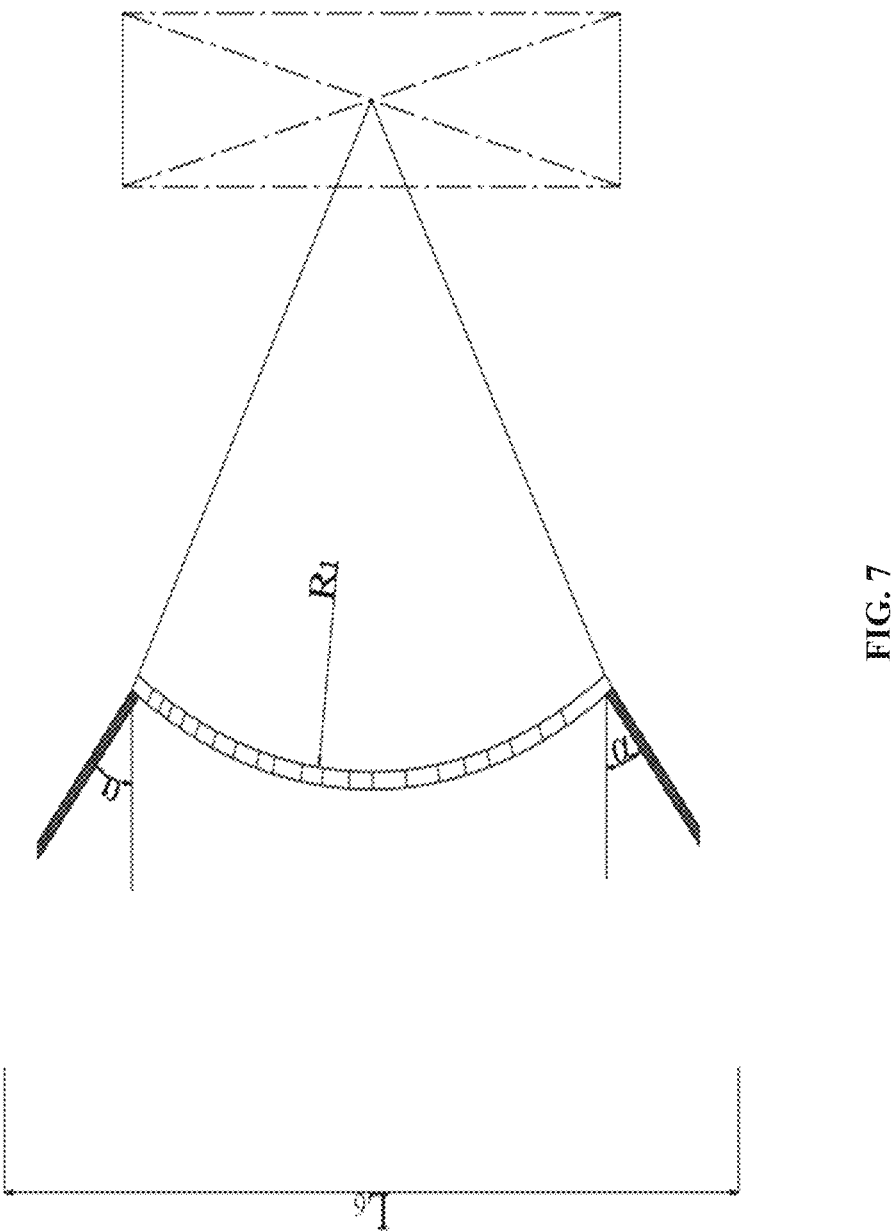
FIG. 7 is a top view of an arc-shaped main diversion plate in the present disclosure.

As shown in FIG. 7, the main diversion plate is of a curved surface structure with the same thickness or with a thin upper portion and a thick lower portion, the included angles between the main diversion plate and the riverbed as well as between the auxiliary diversion plates and the riverbed are set to be 45° to 90°, and the main diversion plate is set to be of an axisymmetric structure.

The supports as auxiliary supporting are installed on the front surface and the rear surface of the main diversion plate, and ground anchors are used for anchoring the supports at the bottom of the riverbed.

The base and the guide plate support are of rigid structures and are kept fixed at the bottom of the riverbed, the angle between the main diversion plate and the bottom of the riverbed can be adjusted through the supports, and large output power is provided for the waterwheel under different incoming flow conditions.

Embodiment III

The length $L_4$ of the main diversion plate is 0.9-1.3 times of the width $L_1$ of the waterwheel runner, and the height of the top of the main diversion plate is gradually reduced along the length direction to form an upwards convex arc structure. The diameter $D_2$ of the contour line of the arc structure of the main diversion plate is $0.8L_4$ to $2.5L_4$, the distances $H_3$ between the tops of the auxiliary diversion plates and the free liquid level are $0$-$0.15D_1$ of the height of the waterwheel runner, the heights of the auxiliary diversion plates are $H_2$, and the distance $H_2$ penetrating into the riverbed is suggested to be $0.2D_1$ to $0.6D_1$.

The ratios of the lengths $L_3$ of the auxiliary diversion plates to the length $L_4$ of the main diversion plate are 0-0.4.

The distance $L_5$ between the main diversion plate and the center of the waterwheel is 1-2.5 times of the diameter of the waterwheel runner.

The porosity of the main diversion plate is smaller than that of the auxiliary diversion plates, the porosity of the main diversion plate is in the range of 2% to 8%, the porosity of the main diversion plate is smaller in the middle and larger at the two ends, and the porosity of the auxiliary diversion plates is in the range of 5% to 15%.

Embodiment IV

When in use, the convex type guide plate waterwheel energy increasing device with gradually dense holes is installed on the incoming flow surface of the waterwheel, and the waterwheel with the diameter of 2.9 m, the waterwheel submerging depth of 1.2 m and the waterwheel width of 11 m is taken as an example The convex type guide plate waterwheel energy increasing device with gradually dense holes is arranged at the position 4.35 m in front of the waterwheel, the length of the main diversion plate is 11 m, the radius of the arc structure contour line is 15 m, the lengths of the auxiliary diversion plates are 1 m, the porosity of the main diversion plate is 10%, and the porosity of the auxiliary diversion plates is 12%. Holes of the main plate are gradually dense from the middle to the two ends, the middle holes are the most sparse, a certain included angle is formed between the main diversion plate and the bottom of the riverbed by adjusting the supports, and the included angle between the main diversion plate and the ground of the riverbed is 60°.

The foregoing descriptions are merely example implementations of the present disclosure. It should be noted that those skilled in the art may make several improvements or embellishments without departing from the principle of the present disclosure and the improvements or embellishments shall fall within the protection scope of the present disclosure.

What is claimed is:

1. A convex guide plate for a waterwheel energy device, comprising:
   fixed devices,
   a main diversion plate and auxiliary diversion plates attached to two opposed ends of the main diversion plate, an upwards convex arc structure is arranged on a top surface of the main diversion plate,
   first through holes of various diameters disposed on the main diversion plate such that a porosity of a middle of the main diversion plate is less than porosities of the two ends of the main diversion plate,
   second through holes are formed in the auxiliary diversion plates,
   the fixed devices are fixed to two sides of the auxiliary diversion plates, and the fixed devices are used for fixing the main diversion plate and the auxiliary diversion plates to a riverbed.

2. The convex guide plate according to claim 1, wherein heights of the auxiliary diversion plates are equal to heights of the two ends of the main diversion plate, the main diversion plate is axisymmetric, and the main diversion plate is a planar structure with a uniform thickness or with a thin upper portion and a thick lower portion or a curved surface structure with a uniform thickness or with a thin upper portion and a thick lower portion.

3. The convex guide plate according to claim 1, wherein the fixed devices are capable of orienting the main diversion plate and the auxiliary diversion plates to be inclined at an angle of 45° to 90° with respect to the horizontal.

4. The convex guide plate according to claim 1, wherein a diameter of the contour line of the arc structure on the top surface of the main diversion plate is 0.8-2.5 times a length of the main diversion plate.

5. The convex guide plate according to claim 1, wherein ratios of lengths of the auxiliary diversion plates to a length of the main diversion plate are less than or equal to 0.4.

6. The convex guide plate according to claim 1, wherein the fixed devices comprise a base, a guide plate support is arranged on the base, inserting grooves are formed in an inner side of the guide plate support, outer sides of the auxiliary diversion plates are fixed to the guide plate support through the inserting grooves, locking sleeve holes are transversely formed in the guide plate support, locking pins are inserted from outer sides of the locking sleeve holes, and tail ends of the locking pins are fixed to outer side surfaces of the auxiliary diversion plates; and ground supports are arranged on a front surface and a rear surface of the main diversion plate, and ground anchors are arranged at tail ends of the ground supports.

7. The convex guide plate according to claim 1, wherein the porosities of the main diversion plate are in the range of 2% to 8%, and porosities of the auxiliary diversion plates are in the range of 5% to 15%.

8. The convex guide plate according to claim 1, wherein the first through holes and the second through holes are triangular, circular or oval in shape.

9. An energy conversion system for placing on a riverbed comprising:
   the convex guide plate according to claim 1; and
   a waterwheel spaced from the convex guide plate.

10. The energy conversion system of claim 9, wherein a length of the main diversion plate is 0.9-1.3 times a width of a runner of the waterwheel.

11. The energy conversion system of claim 9, wherein a distance between the main diversion plate and a center of the waterwheel is 1-2.5 times a diameter of a runner of the waterwheel.

* * * * *